H. C. OEHRLE.
COUPLING BOLT.
APPLICATION FILED APR. 22, 1913.
1,097,185.
Patented May 19, 1914.
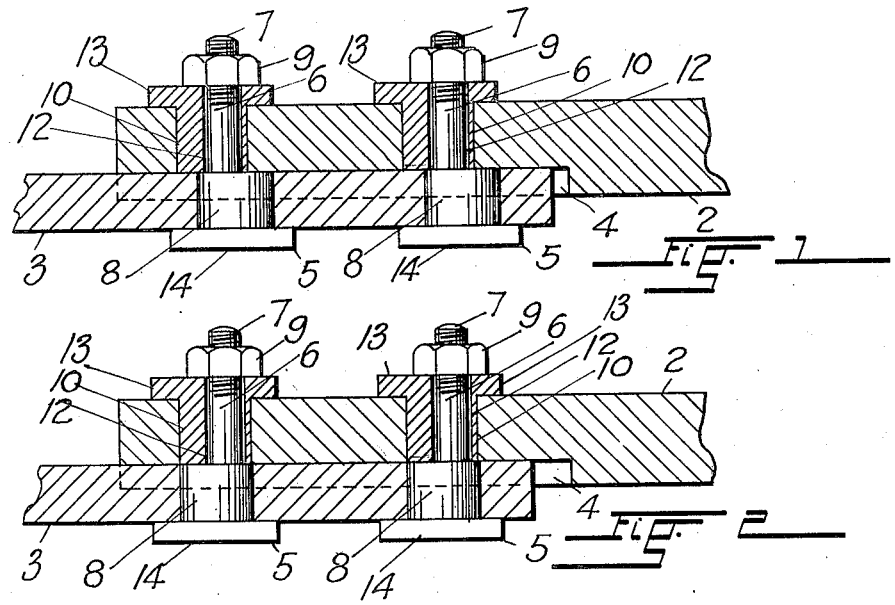
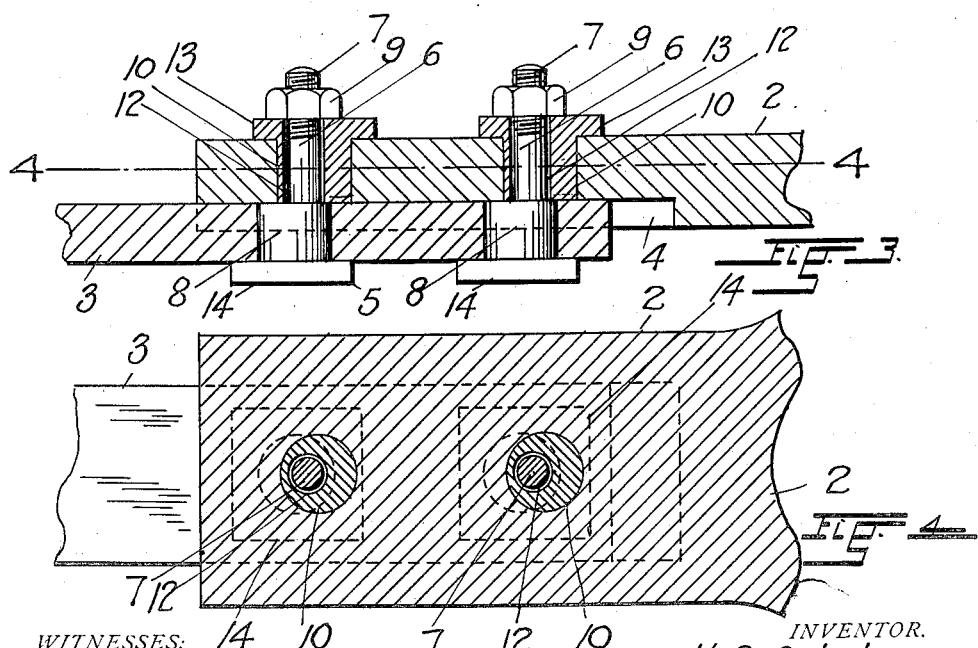
WITNESSES:
INVENTOR.
H. C. Oehrle.
BY
ATTORNEY.

UNITED STATES PATENT OFFICE.

HENRY C. OEHRLE, OF DENVER, COLORADO.

COUPLING-BOLT.

1,097,185.

Specification of Letters Patent.

Patented May 19, 1914.

Application filed April 22, 1913. Serial No. 762,855.

*To all whom it may concern:*

Be it known that I, HENRY C. OEHRLE, a citizen of the United States, residing at Denver, in the county of Denver and State of Colorado, have invented certain new and useful Improvements in Coupling-Bolts, of which the following is a specification.

My invention relates to improvements in coupling bolts and its object resides in the provision of a device of simple construction which is adapted to adjust to a limited extent, the relative position of two pieces which it connects.

While my invention may be effectively employed for many other purposes, it is particularly adapted for use as a fastening means to secure the overlapping ends of longitudinally alined machine parts, inasmuch as by its use the said parts may be adjusted with relation to each other to lengthen or shorten the distance between the elements with which they are connected without disturbing their said alinement.

In the accompanying drawings my invention has been shown as applied to a splice-joint between the stub of an eccentric-ring and the blade which connects the eccentric with a slide-valve or other reciprocating element. In a joint of this character the end of the blade is usually fitted in a longitudinal recess of the stub whereby it is securely held against lateral displacement while being longitudinally adjustable, and the two pieces are rigidly secured to each other by means of bolts which occupy registering openings in the same and which are fastened by means of nuts screwed onto the threaded extremities of their shanks.

In proceeding in accordance with the present invention I provide a bolt whose shank has adjacent its head, an integral eccentric collar which in practice, occupies the bolt-hole in one of the parts to be connected, and a headed bushing which is designed to be inserted in the bolt-hole of the other part and which has an eccentric bore for the reception of the body-portion of the bolt-shank which as usual is threaded at its extremity for the application of a nut to secure the members of the device and the parts to which it is applied in their adjusted position. By turning one or both of the members of my improved coupling bolt, the two parts connected thereby, may when their bolt-holes are in register, be moved in either direction, a distance equal to the eccentricity of the two portions of the bolt-shank or of the bore of the bushing without lateral displacement.

In the drawings in the various views of which like parts are similarly designated, Figures 1, 2 and 3 represent similar longitudinal sections through two lapping machine-parts connected by two of my improved coupling-bolts the members of which have been shown in the different relative positions to which they may be adjusted to lengthen or shorten the connection produced by the said parts, and Fig. 4, a section taken along the line 4—4, Fig. 3.

Referring to the drawings in detail, the reference character 2 designates the stub of an eccentric-ring, and 3 the blade which is longitudinally slidably fitted in a recess 4 formed in one side thereof. The two parts 2 and 3 have as usual, bolt-holes of equal diameter to receive the coupling bolts and in, this connection it will be observed that the use of my invention does not require any changes whatsoever in the construction of the parts to which it is applied.

My improved coupling bolt consists of a bolt-member 5, the shank 6 of which has adjacent its head 14 an eccentric collar 8 of larger diameter, the end of the body portion 7 of the shank being threaded for the application of a nut 9. The other member of the device consists of a bushing 10 whose exterior diameter corresponds with that of the collar portion 8 of the bolt-shank and which has an eccentric bore 12 adapted to receive the body portion 7 of the same. The bushing is provided with a head 13 to engage the outer surface of the part to which it is applied.

To connect two parts by the use of my invention, the shank of the bolt-member is inserted through corresponding bolt-holes of the same, one of which is occupied by its eccentric collar. The bushing is inserted in the hole of the other part around the body portion of the bolt-shank which projects through its eccentric-bore and the parts are secured in their relative position by means of the nut 9 which is screwed onto the protruding threaded extremity of the bolt-shank against the outer surface of the head of the bushing. When the bolt-holes of the two lapping parts are axially in alinement, as shown in Fig. 2, the connection produced by the said parts is of medium length, the same may be readily shortened by turning the bolt through an arc of 180 degrees to the position shown in Fig. 1, or the connection may be lengthened an equal amount by leaving the bolt in the position it occupied and turning the bushing through a similar arc to the position illustrated in Fig. 3. It is obvious that in case the bolt is originally in the position shown in Fig. 1 and the holes in the two parts are in alinement, the adjustment of the bolt will serve to lengthen the connection, while by movement of the bushing the same is shortened.

Having thus described my invention what I claim and desire to secure by Letters-Patent is:

1. A device of the character described comprising a headed bolt the shank of which has adjacent the head of the bolt an eccentric collar, and an eccentrically bored bushing rotatable on the body portion of the shank.

2. A device of the character described comprising a headed bolt, the shank of which is threaded at its extremity for the application of a nut and has adjacent the head of the bolt, an eccentric collar, and an eccentrically bored bushing rotatable on the body portion of the shank.

3. A device of the character described comprising a bolt the shank of which is composed of two relatively eccentric portions, and an eccentrically bored bushing rotatable on one of said portions, and adapted for insertion in a bolt hole.

4. A device of the character described comprising a bolt the shank of which is composed of two relatively eccentric portions, and an eccentrically bored bushing rotatable on one of said portions, and adapted for insertion in a bolt hole, the last mentioned portion of the shank being threaded at its extremity for the application of a nut.

5. A device of the character described comprising a headed bolt the shank of which has adjacent the head of the bolt an eccentric collar, and an eccentrically bored bushing which in diameter corresponds with said collar and which is rotatable on the shank of the bolt.

6. A joint composed of parts having registering bolt holes, a headed bolt the shank of which is threaded at its extremity for the application of a nut and has an eccentric collar rotatably fitted in one of said bolt holes, an eccentrically bored bushing rotatable on the shank, within the other bolt-hole, and a nut on the threaded end of the shank.

7. A joint composed of parts having registering bolt holes of equal diameter, a headed bolt the shank of which is threaded at its extremity for the application of a nut and has an eccentric collar rotatably fitted in one of said bolt-holes, an eccentrically bored bushing rotatable on the shank, within the other bolt-hole, and a nut on the threaded end of the shank.

In testimony whereof I have affixed my signature in presence of two witnesses.

HENRY C. OEHRLE.

Witnesses:
G. J. ROLLANDET,
L. RHOADES.